United States Patent [19]

Zaima et al.

[11] Patent Number: 4,973,531
[45] Date of Patent: Nov. 27, 1990

[54] ARRANGEMENT FOR TIGHTENING STACK OF FUEL CELL ELEMENTS

[75] Inventors: Nobuyuki Zaima, Yokohama; Tetsuya Hirata, Tokyo; Minoru Hotta, Yokohama, all of Japan

[73] Assignee: Ishikawajima-Harima Heavy Industries Co., Ltd., Tokyo, Japan

[21] Appl. No.: 311,458

[22] Filed: Feb. 16, 1989

[30] Foreign Application Priority Data

Feb. 19, 1988 [JP] Japan .................................. 63-37092
Oct. 27, 1988 [JP] Japan ................................ 63-139224

[51] Int. Cl.⁵ .......................................... H01M 8/02
[52] U.S. Cl. ...................................... 429/37; 429/66
[58] Field of Search .................. 429/35–37, 429/66

[56] References Cited

U.S. PATENT DOCUMENTS

| 3,979,224 | 9/1976 | Strasser | 429/36 X |
| 4,317,864 | 3/1982 | Strasser | 429/36 |
| 4,642,274 | 2/1987 | Tsutsumi et al. | 429/37 X |

FOREIGN PATENT DOCUMENTS 290432  8/1953  Switzerland .................. 429/66

Primary Examiner—Stephen J. Kalafut
Attorney, Agent, or Firm—R. A. Blackstone, Jr.

[57] ABSTRACT

An arrangement for tightening a stack of fuel cell elements, each cell element including a cathode, an anode and a tile sandwiched by the cathode and the anode and the cell elements being piled up one after another with separators being interposed therebetween, comprising an upper and a lower holders for holding the fuel cell stack, an upper and a lower pressure-adjusting members for sandwiching the upper and lower holders, each pressure-adjusting member including a hollow body constructed by welding two thin, metallic plates and gas enclosed in the hollow body, an upper and a lower adiabatic materials for sandwiching the pressure-adjusting members, and a pressing device for pressing the upper and lower adiabatic materials, the adiabatic materials, the pressure-adjusting members, the holders and the fuel cell stack, wherein the pressing force of the pressing device is given to the holders and the fuel cell stack through the pressure-adjusting members in the form of an uniform pressure.

20 Claims, 3 Drawing Sheets

ARRANGEMENT FOR TIGHTENING STACK OF FUEL CELL ELEMENTS

BACKGROUND OF THE INVENTION

1. Technical Field

The present invention relates to an arrangement for tightening a stack of fuel cell elements that directly converts chemical energy to electrical energy.

2. Background Art

A cell element of a known fuel cell arrangement, in case of a fused carbonate type fuel cell for instance as illustrated in FIG. 6 of the accompanying drawings, comprises a cathode (oxide electrode) 2, an anode (fuel electrode) 3 and a tile (a plate of electrolyte) 1 interposed between these electrodes. The cell elements I are stacked one after another with separator plates 4 being interposed therebetween, so as to form a stack S. Oxidizing gas OG is supplied to the cathode 2 and fuel gas FG is supplied to the anode 3, whereby power generation takes place.

The fuel cell arrangement depicted in FIG. 6, which is called an internal manifold type fuel cell arrangement, possesses a plurality of separator plates 4, each plate being provided with convex-concave gas passages on either face thereof at central part thereof (indicated like a wave in FIG. 6). Oxidizing gas passages 5 and 6 and fuel gas passages 7 and 8 extend penetrating the fuel cell stack S near the periphery thereof. The tiles of fused carbonate serve as wet-sealing means. The stack S also includes a plurality of masking plates 9 disposed between the separators 4 and the tiles 1 for the sake of sealing. The convexo-concave passages and the vertically extending fuel and oxidizing gas passages FG and OG are enclosed and connected to each other by the masking plates 9. The stack S is provided with an upper presser plate (not shown) and a lower presser plate (not shown) respectively on the top and the bottom faces thereof, and these presser plates are pressed by springs, for example, near the periphery thereof as indicated by arrows 50.

Meantime it is known that an uniform contact is required between the tile 1, the cathode 2, the anode 0 and the separator plate 4, and that the wet-sealing has to be maintained, in order to ensure a proper function of the fuel cell. It is obvious that less pressure is exerted on the central part of the fuel cell as the fuel cell is designed larger if only springs are provided as the stack-tightening device which only press the periphery of the stack. This wouLd be overcome by employing thicker presser plates. However, employing thicker presser plates would lead to an undesired construction: a thicker fuel cell arrangement, and in turn a larger casing for the same.

Another prior art arrangement for tightening the fuel cell stack S is illustrated in FIG. 7. A lower holder equipped with a heater, 115 is provided on a lower bolster plate of a pressing machine via a adiabatic material 113. Vertical rods 116 extend upward from the lower bolster plate 111 and support an upper bolster plate 110 spanning the vertical rods 116. The upper bolster plate 110 supports an upper holder (a presser plate) provided with a heater, 114 which is attached to a lower face of a adiabatic member 112 and a cyLinder 117 for moving the upper holder. The upper holder 114 is lowered by the cylinder 117 and exerts pressure on the stack S between the upper and the lower holders 114 and 115 As the height of the fuel cell stack S decreases during power generation, the cylinder 117 lowers the upper holder 114 so as to keep the tightening pressure unchanged. However, the deflection of the upper and lower holders 114 and 115 must be low in order to obtain unchanged tightening pressure. For this purpose, the upper and lower holders 114 and 115 as well as the upper and lower bolster plates 110 and 110 have to be designed thicker. Therefore, this prior art arrangement is not suited for a compact system.

Another tightening arrangement which uses air pressure by means of bellows is known in the art. However, this arrangement has to be equipped with very long bellows to respond the reduction of the fuel cell stack in height. The long bellows raises the expense of the entire arrangement.

SUMMARY OF THE INVENTION

One object of the present invention is to provide a fuel cell stack tightening apparatus that prevents the reduction of the pressure on the central part of the fuel cell stack and presses the fuel cell stack with uniform pressure without employing thicker presser plates.

Another object of the present invention is to provide a compact, inexpensive fuel cell stack tightening apparatus that exerts an uniform pressure on the fuel cell stack without employing thick bolster plates and holders and that adjusts the tightening pressure upon shrinkage of the fuel cell stack.

According to one aspect of the present invention, there is provided a tightening apparatus used for a fuel cell stack including a plurality of fuel cell elements of anode plates, tiles and cathode plates with separator plates being interposed between the fuel cell elements, which tightening apparatus comprising an upper and lower holder plates for the fuel cell stack and an upper and a lower presser plates with a pair of thin, hollow plates that includes therein porous adiabatic members being interposed between the holder plate and the presser plate. The upper and lower presser plates are pressed by springs. As the temperature of the fuel cell stack increases, each thin, hollow plate between the holder plate and the presser plate expands and exerts pressure against the holder plate and the presser plate, and in turn the holder plates are pressed toward the fuel cell stack, thereby exerting an uniform pressure thereon.

According to another aspect of the present invention, there is provided an arrangement for tightening a stack of fuel cell elements, each cell element including an anode plate, a tile and a cathode plate with a separator plates being interposed between adjacent cell elements, which arrangement comprising an upper and a lower holders for sandwiching the fuel cell stack, an upper and a lower adiabatic members for sandwiching the upper and lower holders and an upper and a lower bolster plates of a pressing machine for pressing the upper and the lower adiabatic members with an upper metallic cushion being interposed between the upper holder and the upper adiabatic member and a lower metallic cushion being interposed between the lower holder and the lower adiabatic member. In this arrangement, the pressing force of the pressing machine is transmitted to the fuel cell stack via the upper and the lower bolster plates, the upper and the lower adiabatic members, the upper and the lower metallic cushions and the upper and the lower holders. During the pressure transmission, these cushions serve as pressure-adjusting means i.e., as the cushion members are pressed, the reaction forces thereof press the fuel cell stack in the form of an uniform pressure via the holders. Also, the pressing machine is able to compensate the change of the tightening pressure when the fuel cell stack shrinks during power generation.

DESCRIPTION OF THE PREFERRED EMBODIMENTS

Now, preferred embodiments of the present invention will be explained with the accompanying drawings.

Embodiment 1

Figure 1:
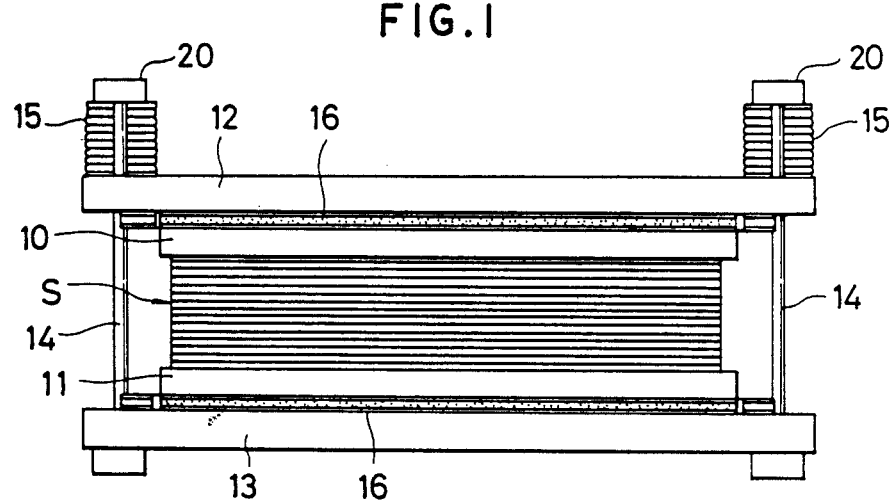
FIG. 1 is a lateral view showing an arrangement for tightening the fuel cell stack according to a first embodiment of the present invention.
Figure 2:
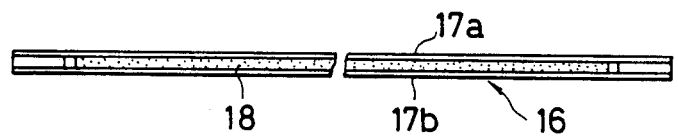
FIG. 2 is a sectional view showing a hollow plate of FIG. 1.
Figure 4:
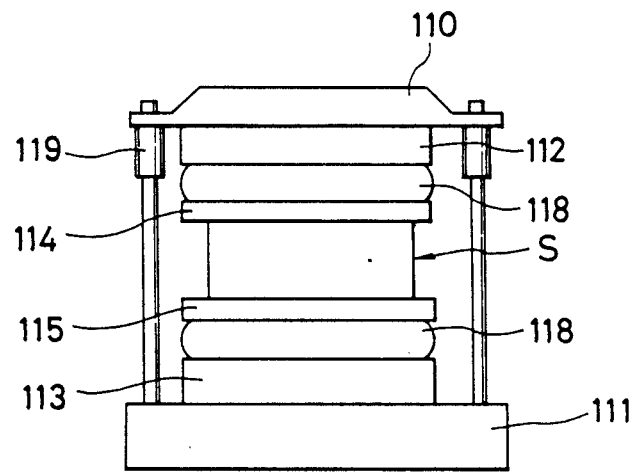
FIG. 4 is a schematic view showing another tightening arrangement for the fuel cell stack according to a second embodiment of the present invention.
Figure 5:
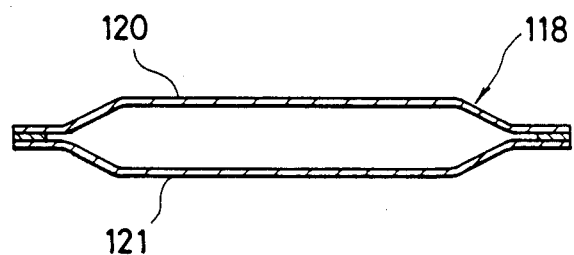
FIG. 5 is a sectional view of a cushion member of FIG. 4.
Figure 6:
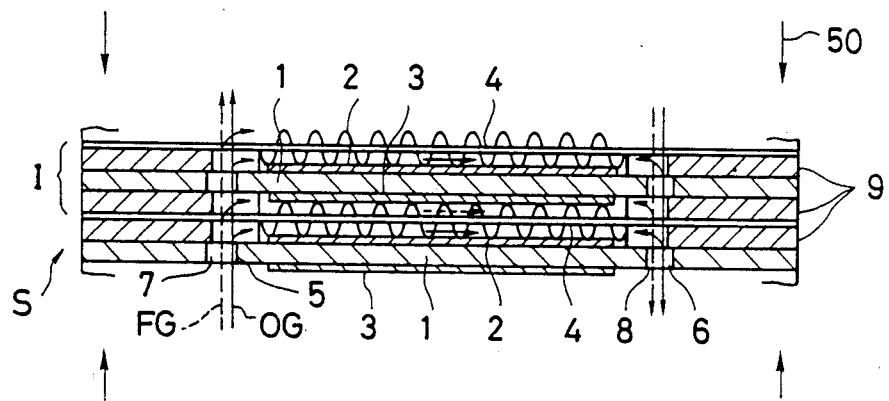
FIG. 6 is a partial sectional view of the fuel cell stack.
Figure 7:
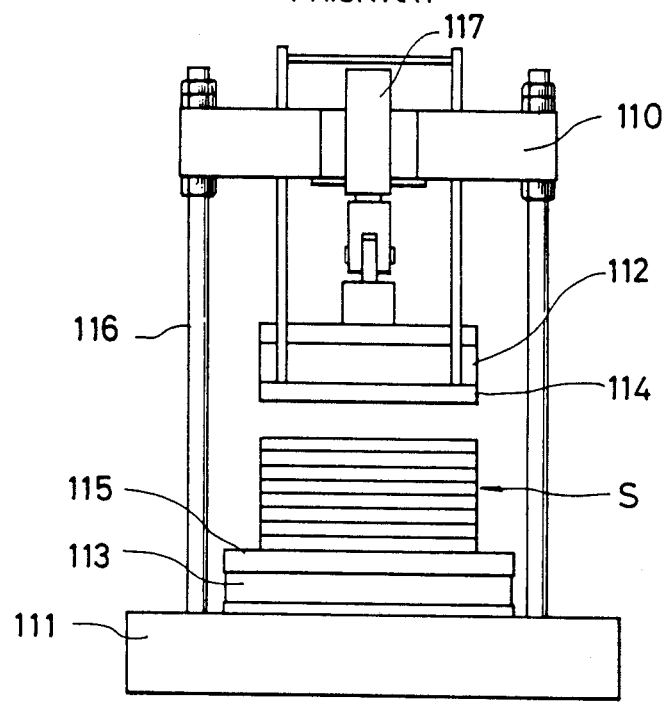
FIG. 7 schematically illustrates a prior art arrangement for tightening the fuel cell stack.

FIGS. 1 through 8 illustrate a first embodiment of the present invention. A fuel cell stack S, as previously explained with reference to FIG. 6, is constituted by plural fuel cell elements, each cell element including a cathode plate, an anode plate and a tile sandwiched by these plates, that are piled up one after another with separator plates being interposed between the cell elements. The stack S, as shown in FIG. 1, is disposed between an upper and a lower holders 10 and 11 which are in turn sandwiched by an upper and a lower hollow plates 16 and 16, and an upper and a lower presser plates 12 and The upper and the lower presser plates 12 and 13 are connected to each other by rods 14 and 14 at the periphery thereof. A spring 15 is provided between the head 20 of each rod 14 and the upper holder plate 12, so as to press the fuel cell stack S via the upper and the lower holders 10 and 11, and the upper and the lower hollow plates 16 and 16. The hollow plate 16, as illustrated in FIG. 2, comprises a sealed hollow body of two disc-shaped, thin plates 17a and 17b which are for example seam welded, and a porous material 18 housed therein. Thus, the hollow plate 16 encloses air.

Figure 3:
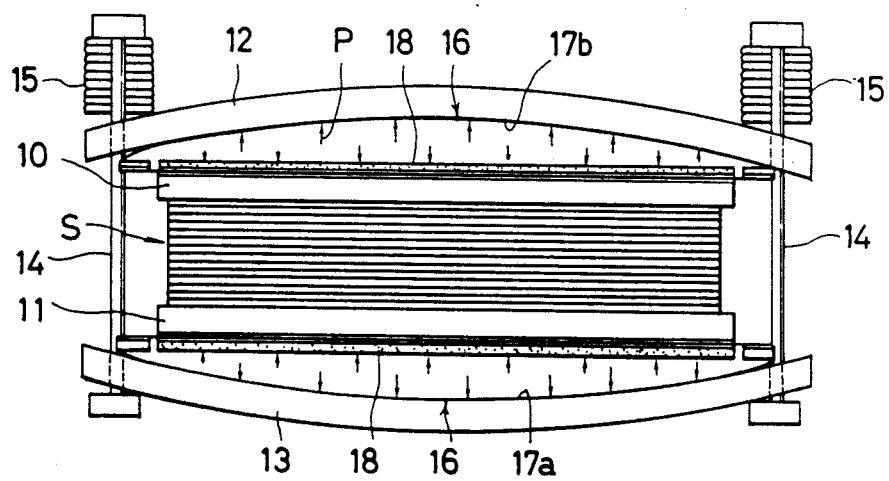
FIG. 3 illustrates how the fuel cell stack is pressed as the fuel cell stack temperature rises.

As the fuel cell starts power generation, the stack temperature rises and reaches to approximately 650 degrees C 1202 degrees F). Due to this temperature rise, the internal pressure P of the hollow plate 16 also rises. Then, as shown in FIG. 3, the upper thin plate 17a between the upper holder and the upper presser plate 12 is bent upward, and the lower thin plate 17b between the lower holder 11 and the lower presser plate 10 is bent downward. While the thin upper and the lower presser plates 12 and 10 are bent outward as the thin plate 17a of the upper hollow plate 16 and the thin plate 17b of the lower hollow plate 10 are, the holders 10 and 11 are pressed against the stack S, so that the adequate tightening pressure is given on the central part of the stack S. Thus, the stack S is tightened with an uniform pressure without employing thicker presser plates, and in turn a compact fuel cell arrangement can be designed.

Although two round plates are utilized to form a hollow body of the hollow plate 16 in the foregoing embodiment, square plates may be utilized instead thereof.

Embodiment 2

Referring now to FIG. 4 which depicts a second embodiment of the present invention, the fuel cell stack S is sandwiched by an upper and a lower, heater equipped holders 114 and 115, an upper and a lower cushion members 118 and 118, an upper and a lower adiabatic members 112 and 113, and an upper and a lower bolster plates 110 and 111 of a pressing machine. The cushion member 118 consists of a hollow body and a filler medium which inflates the hollow body as shown in FIG. 5. The hollow body includes two metallic plates 120 and 121 joined by welding at their periphery, and the filler medium may be gas such as air or liquid such as oil, or combination of the two. The upper and the lower bolster plates 110 and 111 are biased toward the fuel cell stack S by the pressing elements 119 provided with compression springs. The biasing force of the pressing elements 119 is transmitted to the stack S via the bolster plates 110 and the adiabatic members 112 and 113, the cushion members 118 and 118 and the holders 114 and 115. In this case, as the pressing force is imposed on the metallic cushion member 118, a reaction force thereof works against the holders 114 and 115 which sandwich the fuel cell stack S. Therefore, an uniform pressure is exerted on the upper and the lower faces of the stack S, namely on the cathode plates, the tiles, the anode plates and the separator plates. Also, even if the fuel cell stack S shrinks during power generation, an uniform pressure on the stack S is maintained since the distance between the upper and the lower bolster plates 110 and 111 is automatically reduced by the compression springs of the pressing elements 110.

As explained above, the uniform pressure is exerted on the fuel cell stack due to the cushion members 118, and the follow up control relative to the shrinkage of the stack S is ensured by the pressing elements 119. Therefore, it is possible to provide an inexpensive, compact tightening arrangement without employing thicker bolster plates or long bellows which are employed by the prior art arrangements.

In this particular embodiment, the cushion members 118 and 118 are disposed between the holders 114 and 115 and the adiabatic members 112 and 113. However, these cushions may be located between the adiabatic members 112 and 113 and the bolster plates 110 and 111. Further, if the lower bolster plate 111 is rigid enough, for instance in a case where the lower bolster serves as a base, there may be provided only one cushion member. Moreover, the pressing elements may further include the cylinders of FIG. 7. In addition, the holders may be removed from the arrangement if tightening of the fuel cell stack is ensured by other members.

Also, it is recognized, of course, that the correlative terms "upper" and "lower" are used herein to make the description and claims more readily understandable and not meant to limit the scope of the present invention and that various modifications may be also made to the above embodiments without departing the spirit and scope of the present contribution to the art.

We claim:

1. An arrangement for tightening a stack of fuel cell elements, comprising:
   an upper and a lower holders for sandwiching said fuel cell stack;
   an upper and a lower expandable members for sandwiching said upper and lower holders, each expandable member being constructed such that it expands as said fuel cell stack temperature rises, so as to exert an uniform pressure on said upper and lower holders as well as said fuel cell stack;
   an upper and a lower presser plates for sandwiching said expandable members; and
   pressing means for pressing said upper and lower presser plates, upper and lower expandable members, upper and lower holders and fuel cell stack.

2. An arrangement of claim 1, wherein each of said expandable member includes a porous, adiabatic element therein.

3. An arrangement of claim 2, wherein each of said expandable member includes a thin, hollow disc plate which encloses said porous adiabatic element.

4. An arrangement of claim 3, wherein said presser plate has a configuration analogous to said thin, hollow plate.

5. An arrangement of claim 1, wherein said pressing means includes rods extending between said upper and lower presser plates, and springs mounted on said rods so as to bias the upper presser plate toward the lower presser plate.

6. An arrangement of claim 2, wherein said pressing means includes rods extending between said upper and lower presser plates, and springs mounted on said rods so as to bias the upper presser plates toward the lower presser plate.

7. An arrangement of claim 3, wherein said pressing means includes rods extending between said upper and lower presser plates, and springs mounted on said rods so as to bias the upper presser plates toward the lower presser plate.

8. An arrangement for tightening a stack of fuel cell elements, comprising:
   an upper and a lower holders for sandwiching said fuel cell stack;
   an upper and a lower adiabatic materials for sandwiching said upper and lower holders;
   pressing means for pressing said upper and lower adiabatic materials, upper and lower holders and fuel cell stack; and
   an upper and a lower pressure-adjusting members for modifying the pressing force of said pressing means in the form of an uniform pressure on said holders and fuel cell stack, the upper and lower pressure adjusting means being respectively interposed between the upper holder and the upper adiabatic material and between the lower holder and the lower adiabatic material.

9. An arrangement of claim 8, wherein one of said pressure-adjusting members is eliminated.

10. An arrangement of claim 8, wherein each of said pressure-adjusting members includes a hollow body made by welding two thin, metallic plates and filler gas enclosed therein.

11. An arrangement of claim 9, wherein each of said pressure-adjusting members includes a hollow body made by welding two thin, metallic plates and filler gas enclosed therein.

12. An arrangement of claim 10, wherein the hollow body further includes liquid therein.

13. An arrangement of claim 11, wherein the hollow body further includes liquid therein.

14. An arrangement of claim 8, wherein said pressing means includes an upper and a lower bolster plates for sandwiching said adiabatic materials, and a pressing elements equipped with compression springs extending said upper and lower bolster plates so as to press said upper and lower adiabatic materials, upper and lower pressure-adjusting members, upper and lower holders and fuel cell stack.

15. An arrangement of claim 9, wherein said pressing means includes an upper and a lower bolster plates for sandwiching said adiabatic members, and a pressing elements equipped with compression springs extending said bolster upper and lower plates so as to press said upper and lower adiabatic materials, upper and lower pressure-adjusting members, upper and lower holders and fuel cell stack.

16. An arrangement of claim 10, wherein said pressing means includes an upper and a lower bolster plates for sandwiching said adiabatic members, and a pressing elements equipped with compression springs extending said bolster upper and lower plates so as to press said upper and lower adiabatic materials, upper and lower pressure-adjusting materials, upper and lower holders and fuel cell stack.

17. An arrangement of claim 11, wherein said pressing means includes an upper and a lower bolster plates for sandwiching said adiabatic members, and a pressing elements equipped with compression springs extending said bolster upper and lower plates so as to press said upper and lower adiabatic materials, upper and lower pressure-adjusting members, upper and lower holders and fuel cell stack.

18. An arrangement of claim 14, wherein said compression springs adjust the distance between said upper and lower bolster plates as said fuel cell stack changes its height.

19. An arrangement of claim 15, wherein said compression springs adjust the distance between said upper and lower bolster plates as said fuel cell stack changes its height 20. An arrangement of claim 16, wherein said compression springs adjust the distance between said upper and lower bolster plates as said fuel cell stack changes its height.

* * * * *